US007758968B2

(12) United States Patent
Schmitz et al.

(10) Patent No.: US 7,758,968 B2
(45) Date of Patent: Jul. 20, 2010

(54) COMPONENT WITH THERMAL BARRIER COATING AND EROSION-RESISTANT LAYER

(75) Inventors: Friedhelm Schmitz, Dinslaken (DE); Kai Wieghardt, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 1028 days.

(21) Appl. No.: 10/582,604

(22) PCT Filed: Dec. 1, 2004

(86) PCT No.: PCT/EP2004/013660

§ 371 (c)(1), (2), (4) Date: Jun. 9, 2006

(87) PCT Pub. No.: WO2005/061856

PCT Pub. Date: Jul. 7, 2005

(65) Prior Publication Data

US 2007/0148478 A1 Jun. 28, 2007

(30) Foreign Application Priority Data

Dec. 11, 2003 (EP) ................................ 03028576

(51) Int. Cl.
*B32B 9/00* (2006.01)
*C22C 38/18* (2006.01)

(52) U.S. Cl. ......................... 428/469; 420/34; 420/103

(58) Field of Classification Search .................. 420/11, 420/34, 103; 428/469
See application file for complete search history.

(56) References Cited

U.S. PATENT DOCUMENTS

| | | | | | |
|---|---|---|---|---|---|
| 4,248,940 | A | * | 2/1981 | Goward et al. | 428/633 |
| 4,405,284 | A | | 9/1983 | Albrecht et al. | |
| 4,446,199 | A | * | 5/1984 | Gedwill et al. | 428/639 |
| 4,761,346 | A | | 8/1988 | Naik | |
| 5,190,598 | A | * | 3/1993 | Qureshi | 148/217 |
| 5,273,712 | A | | 12/1993 | Czech et al. | |
| 5,350,599 | A | | 9/1994 | Rigney et al. | |
| 5,401,307 | A | | 3/1995 | Czech et al. | |
| 5,683,226 | A | | 11/1997 | Clark et al. | |
| 5,740,515 | A | | 4/1998 | Beele | |
| 6,302,318 | B1 | * | 10/2001 | Hasz et al. | 228/254 |
| 2003/0008167 | A1 | | 1/2003 | Loch et al. | |
| 2003/0027012 | A1 | | 2/2003 | Spitsberg et al. | |
| 2003/0035892 | A1 | | 2/2003 | Darolia et al. | |
| 2003/0152814 | A1 | | 8/2003 | Gupta et al. | |

FOREIGN PATENT DOCUMENTS

| | | | |
|---|---|---|---|
| DE | 195 35 227 | A1 | 3/1997 |
| EP | 0 783 043 | A1 | 7/1997 |
| EP | 1 029 104 | A1 | 8/2000 |
| WO | WO 00/70190 | A1 | 11/2000 |
| WO | WO 03/006883 | A1 | 1/2003 |

* cited by examiner

*Primary Examiner*—Gwendolyn Blackwell

(57) ABSTRACT

The invention relates to components of a steam turbine comprising a thermal insulation layer and a metallic anti-erosion layer that is applied to the thermal insulation layer.

16 Claims, 7 Drawing Sheets

COMPONENT WITH THERMAL BARRIER COATING AND EROSION-RESISTANT LAYER

CROSS REFERENCE TO RELATED APPLICATIONS

This application is the US National Stage of International Application No. PCT/EP2004/013660, filed Dec. 1, 2004 and claims the benefit thereof. The International Application claims the benefits of European Patent application No. 03028576.1 filed Dec. 11, 2003. All of the applications are incorporated by reference herein in their entirety.

FIELD OF THE INVENTION

The invention relates to a component having a thermal barrier coating and an erosion-resistant layer.

BACKGROUND OF THE INVENTION

Thermal barrier coatings which are applied to components are known from the field of gas turbines, as described for example in EP 1 029 115.

Thermal barrier coatings enable components to be used at higher temperatures than those permitted by the base material, or allow the service life to be extended.

Known base materials (substrates) for gas turbines allow temperatures of use of at most 1000° C. to 1100° C., whereas a coating with a thermal barrier coating allows temperatures of use of up to 1350° C.

The temperatures of use of components in a steam turbine are much lower, and consequently these demands are not imposed in this application.

It is known from EP 1 029 104 A to apply a ceramic erosion-resistant layer to a ceramic thermal barrier coating of a gas turbine blade or vane.

It is known from DE 195 35 227 A1 to provide a thermal barrier coating in a steam turbine in order to allow the use of materials which have worse mechanical properties but are less expensive for the substrate to which the thermal barrier coating is applied.

U.S. Pat. No. 5,350,599 discloses an erosion-resistant ceramic thermal barrier coating.

US 2003/0152814 A1 discloses a thermal barrier coating system comprising a substrate made from a super alloy, an aluminum oxide layer on the substrate and a ceramic as outer ceramic thermal barrier coating.

EP 0 783 043 A1 discloses an erosion-resistant layer consisting of aluminum oxide or silicon carbide on a ceramic thermal barrier coating.

U.S. Pat. No. 5,740,515 discloses an erosion-resistant layer of a silicide, in particular molybdenum silicide, which has been applied to a ceramic thermal barrier coating.

US 2003/0035892 A1 discloses a ceramic thermal barrier coating system.

U.S. Pat. No. 5,683,226 discloses a component of a steam turbine with an improved resistance to erosion.

The thermal barrier coating is strongly eroded on account of impurities in a medium and/or high flow velocities of the flowing medium which flows past components having a thermal barrier coating.

SUMMARY OF THE INVENTION

Therefore, it is an object of the invention to provide a component which overcomes this problem.

The object is achieved by the component as claimed in the claims.

The subclaims list further advantageous configurations of the components according to the invention. The measures listed in the subclaims can be combined with one another in advantageous ways.

In particular in the case of components of turbines which are exposed to hot fluids for driving purposes, scaling often leads to mechanical impact of detached scale particles on a brittle ceramic layer, which could lead to material breaking off, i.e. to erosion.

Although the ceramic layer is designed to withstand thermal shocks, it is susceptible to locally very limited occurrences of mechanical stresses, since a thermal shock has a more widespread effect on the overall layer.

Therefore, a metallic erosion-resistant layer is particularly advantageous, since it is elastically and plastically deformable on account of its ductility.

The thermal barrier coating does not necessarily serve only to shift the range of uses temperatures upward, but rather is also advantageously used to reduce and/or make more event the thermal expansion caused by the temperature differences which are produced and/or present at the component. It is in this way possible to avoid or at least reduce thermomechanical stresses.

BRIEF DESCRIPTION OF THE DRAWINGS

Exemplary embodiments are illustrated in the figures, in which.

DETAILED DESCRIPTION OF THE INVENTION

Figure 1:
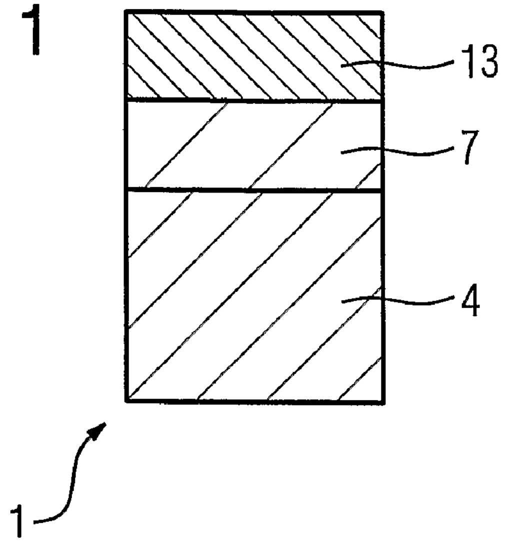
FIGS. 1, 2 show possible arrangements of a thermal barrier coating according to the invention on a component.

FIG. 1 shows a first exemplary embodiment of a component 1 designed in accordance with the invention.

The component 1 is a component of a gas or steam turbine 300, 303 (FIG. 8), in particular a steam inflow region 333, a turbine blade or vane 342, 354, 357 (FIG. 8) or a housing part 334, 335, 366 (FIG. 8, 9) and comprises a substrate 4 (supporting structure) and a thermal barrier coating 7 applied to the substrate, as well as an outer erosion-resistant layer 13 on the thermal barrier coating 7. The erosion-resistant layer 13 can also simultaneously act as a thermal barrier coating, in which case there would in physical terms be only a single layer on the substrate 4.

The erosion-resistant layer 13 preferably consists of a metal or a metal alloy and protects the component from erosion and/or wear, as is the case in particular for steam turbines 300, 303 (FIG. 8), which are subject to scaling, and in which mean flow velocities of approximately 50 m/s (i.e. 20 m/s-100 m/s) and pressures from 350 to 400 bar occur.

The substrate 4 is, for example, a steel or other iron-base alloy (for example 1% CrMoV or 10-12% chromium steels or IN617) or a nickel-base or cobalt-base super alloy.

The thermal barrier coating 7 is in particular a ceramic layer which, for example, at least partially comprises zirconium oxide (partially stabilized or fully stabilized by yttrium oxide and/or magnesium oxide) and/or at least partially comprises titanium oxide and is, for example, more than 0.1 mm thick.

Therefore, it is possible to use thermal barrier coatings 7, which consist 100% of either zirconium oxide or titanium oxide.

The ceramic layer 7 can be applied by means of known coating processes, such as atmospheric plasma spraying (APS), vacuum plasma spraying (VPS), low-pressure plasma spraying (LPPS) and by chemical or physical coating methods (CVD, PVD).

Figure 2:
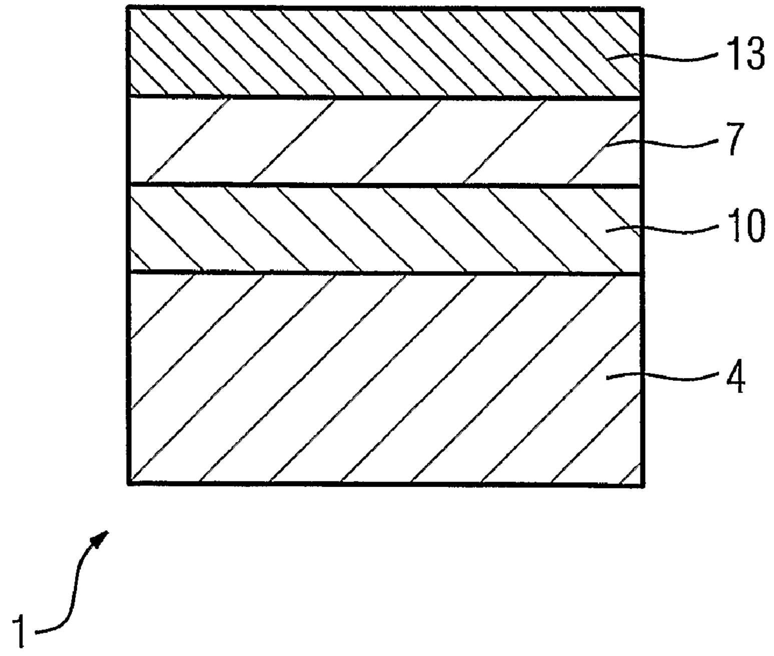

FIG. 2 shows a further configuration of the component 1 designed in accordance with the invention.

At least one further intermediate protective layer 10 is arranged between the substrate 4 and the thermal barrier coating 7.

The intermediate protective layer 10 is used to protect the substrate 4 from corrosion and/or oxidation and/or to improve the bonding of the thermal barrier coating to the substrate 4. This is the case in particular if the thermal barrier coating 7 consists of ceramic and the substrate 4 consists of a metal.

The intermediate protective layer 10 for protecting a substrate 4 from corrosion and oxidation at a high temperature includes, for example, substantially the following elements (details of the contents in percent by weight):

11.5 to 20.0,wt % chromium,
0.3 to 1.5 wt % silicon,
0 to 1.0 wt % aluminum,
0 to 0.7 wt % yttrium and/or at least one equivalent metal selected from the group consisting of scandium and the rare earth elements, remainder iron, cobalt and/or nickel as well as manufacturing-related impurities.

In particular the metallic intermediate protective layer 10 consists of 12.5 to 14.0 wt % chromium,
0.5 to 1.0 wt % silicon,
0 to 0.5 wt % aluminum,
0 to 0.7 wt % yttrium and/or at least one equivalent metal selected from the group consisting of scandium and the rare earth elements, remainder iron and/or cobalt and/or nickel as well as manufacturing-related impurities.

It is preferable if the remainder is iron alone.

The composition of the intermediate protective layer 10 based on iron has particularly good properties, with the result that the protective layer 10 is eminently suitable for application to ferritic substrates 4.

The coefficients of thermal expansion of substrate 4 and intermediate protective layer 10 can be very well matched to one another (up to 10% difference) or may even be identical, so that no thermally induced stresses are built up between substrate 4 and intermediate protective layer 10 (thermal mismatch), which could cause the intermediate protective layer 10 to flake of.

This is particularly important since in the case of ferritic materials, it is often the case that there is no heat treatment carried out for diffusion bonding, but rather the intermediate protective layer 10 (ferritic) is bonded to the substrate 4 mostly or solely through adhesion.

In particular, the substrate 4 is then a ferritic base alloy, a steel or a nickel-base or cobalt-base super alloy, in particular a 1% CrMoV steel or a 10 to 12 percent chromium steel.

Further advantageous ferritic substrates 4 of the layer system 1 consist of a 1% to 2% Cr steel for shafts (309, FIG. 8): such as for example 30CrMoNiV5-11 or 23CrMoNiWV8-8, 1% to 2% Cr steel for housings (for example 335, FIG. 8): G17CrMoV5-10 or G17CrMo9-10, 10% Cr steel for shafts (309, FIG. 8): X12CrMoWVNbN10-1-1, 10% Cr steel for housings (for example 335, FIG. 8): GX12CrMoWVNbN10-1-1 or GX12CrMoVNbN9-1.

To optimize the efficiency of the thermal barrier coating 7, the thermal barrier coating 7 at least in part has a certain open and/or closed porosity.

It is preferable for the wear/erosion-resistant layer 13 to have a higher density than the thermal barrier coating 7, consisting for example of alloys based on iron, chromium, nickel and/or cobalt or, for example, NiCr 80/20 or NiCrSiB with admixtures of boron (B) and silicon (Si) or NiAl (for example: Ni: 95 wt %, A15 wt %).

In particular, a metallic erosion-resistant layer 13 can be used for steam turbines 300, 303, since the temperatures of use in steam turbines at the steam inflow region 333 are at most 450° C., 550° C., 650° C. or 850° C. For temperature ranges of this nature, there are enough metallic layers which offer sufficient protection against erosion as required over the service life of the component 1 while at the same time having a good resistance to oxidation.

Metallic erosion-resistant layers 13 in gas turbines on a ceramic thermal barrier coating 7 within the first stage of the turbine or within the combustion chamber are not possible, since metallic erosion-resistant layers 13 as an outer layer are unable to withstand the temperatures of use of up to 1350° C.

A ceramic erosion-resistant layer 13 partially or 100% comprises chromium carbide, for example.

Further materials for the erosion-resistant layer 13 include, for example, a mixture of tungsten carbide, chromium carbide and nickel (WC, CrC—Ni), for example in proportions by weight of 73 wt % for tungsten carbide, 20 wt % for chromium carbide and 7 wt % for nickel, also chromium carbide with an admixture of nickel ($Cr_3C_2$—Ni), for example in proportions of 83 wt % chromium carbide and 17 wt % nickel, as well as a mixture of chromium carbide and nickel-chromium ($Cr_3C_2$—NiCr), for example in proportions of 75 wt % chromium carbide and 25 wt % nickel-chromium, as well as yttrium-stabilized zirconium oxide, for example in proportions by weight of 80 wt % zirconium oxide and 20 wt % yttrium oxide.

Figure 5:
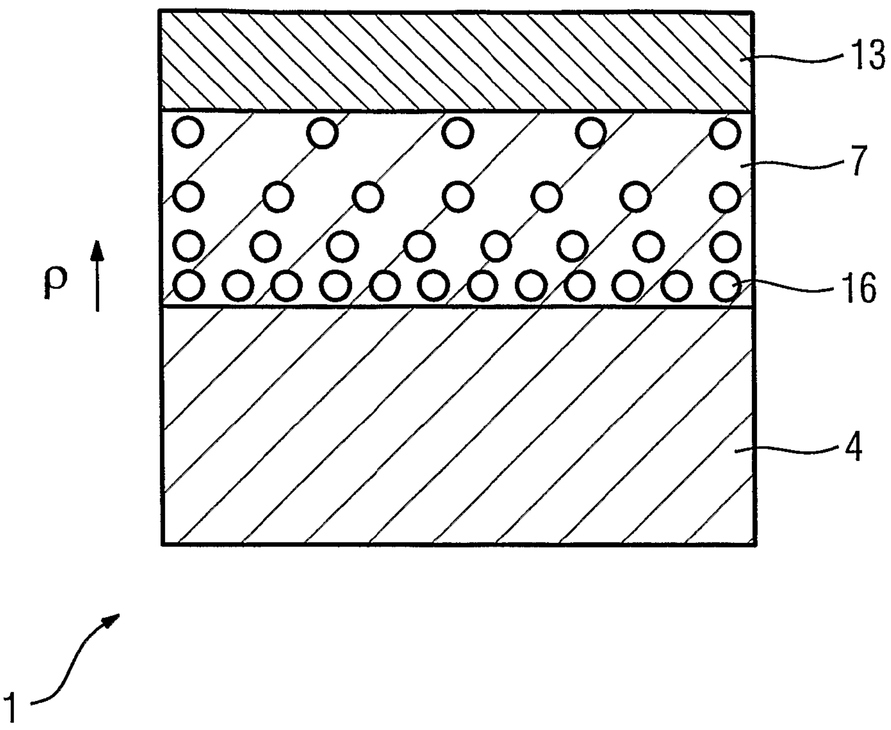
FIGS. 5, 6 show a porosity gradient within the thermal barrier coating of a component designed in accordance with the invention.

The thermal barrier coating 7 is, for example, porous. FIG. 5 shows a porous thermal barrier coating 7 with a porosity gradient.

There are pores 16 in the thermal barrier coating 7. The density ρ of the thermal barrier coating 7 increases in the direction of an outer surface. Therefore, the layer 7 can be used as a thermal barrier in the region where the porosity is greater and if appropriate also to protect against erosion in the region where the porosity is lower.

Therefore, there is preferably a greater porosity toward the substrate 4 or toward an intermediate protective layer 10 that is optionally present than in the region of an outer surface or the contact surface with the erosion-resistant layer 13.

Figure 6:
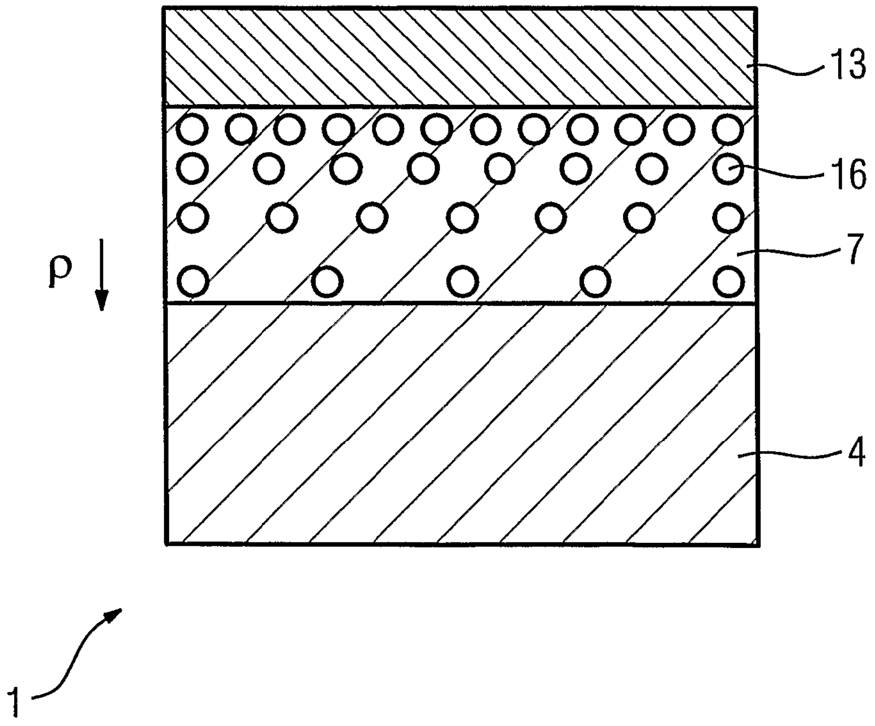

In FIG. 6, the gradient in the density ρ of the thermal barrier coating 7 is opposite to that shown in FIG. 5.

The erosion-resistant layer 13 preferably has a higher density than the thermal barrier coating 7, so that it 13 has a higher strength.

Figure 7A:
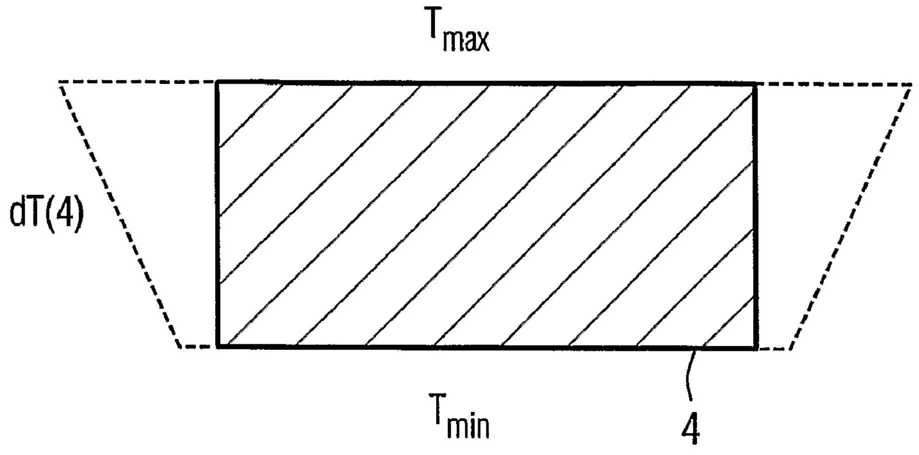
FIG. 7 shows the influence of a temperature difference on a component.

FIGS. 7*a, b* show the influence of the thermal barrier coating 7 on the thermally induced deformation properties of the component 1.

FIG. 7*a* shows a component without thermal barrier coating. Two different temperatures prevail on two opposite sides of the substrate 4, a higher temperature $T_{max}$ and a lower temperature $T_{min}$, resulting in a temperature difference dT(4). The temperature difference dT(4) may amount to at least 200° C.

The higher temperature $T_{max}$ is, for example, at least 450° C., in particular even up to 850° C.

Therefore, as indicated by dashed lines, the substrate 4 expands to a much greater extent in the region of the higher temperature $T_{max}$ on account of thermal expansion than in the region of the lower temperature $T_{min}$. This different expansion causes undesirable deformation of the component (housing).

Figure 7B:
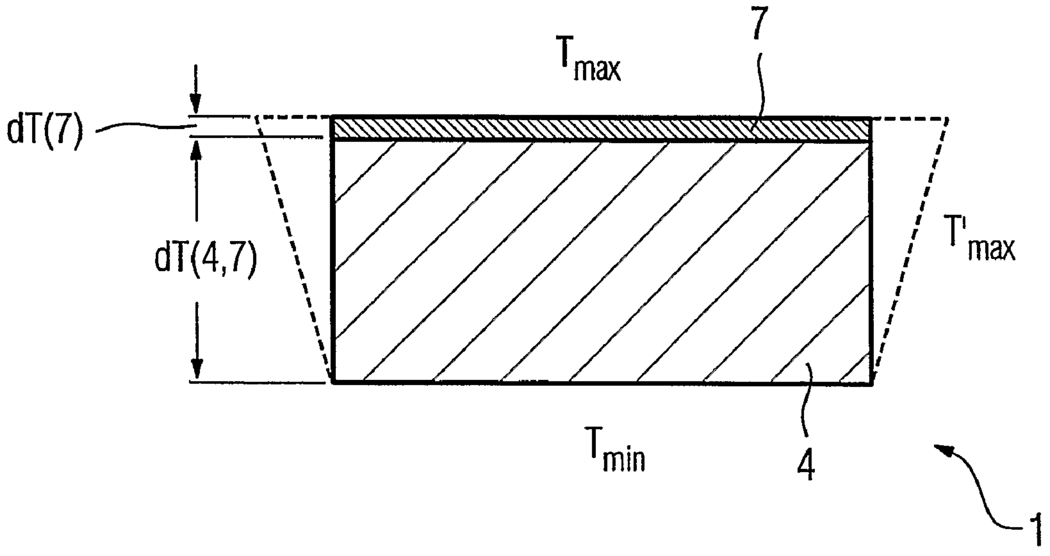

By contrast, in FIG. 7*b* a thermal barrier coating 7 is present on the substrate 4, the substrate 4 and the thermal barrier coating 7 together by way of example being of equal thickness to the substrate 4 shown in FIG. 7*a*.

The thermal barrier coating 7 reduces the maximum temperature at the surface of the substrate 4 disproportionately to a temperature $T'_{max}$, even though the outer temperature $T_{max}$ is just the same as in FIG. 7*a*. This results not only from the distance of the surface of the substrate 4 to the higher temperature but also in particular from the lower thermal conductivity of the thermal barrier coating 7. The temperature gradient is very much greater there than in the metallic substrate 4. As a result, the temperature difference dT (4,7) ($=T'_{max}-T_{min}$) becomes lower than the temperature difference in accordance with FIG. 7*a* (dT(4)=dT(7)+dT(4,7)).

This leads to a lower or scarcely any different thermal expansion of the substrate 4, as indicated by dashed lines, with the result that locally different expansions are at least made more even.

The substrate 4 in FIG. 7*b* can be of precisely the same thickness as that shown in FIG. 7*a*.

The erosion-resistant layer 13 is not illustrated here for the sake of simplicity.

Figure 8:
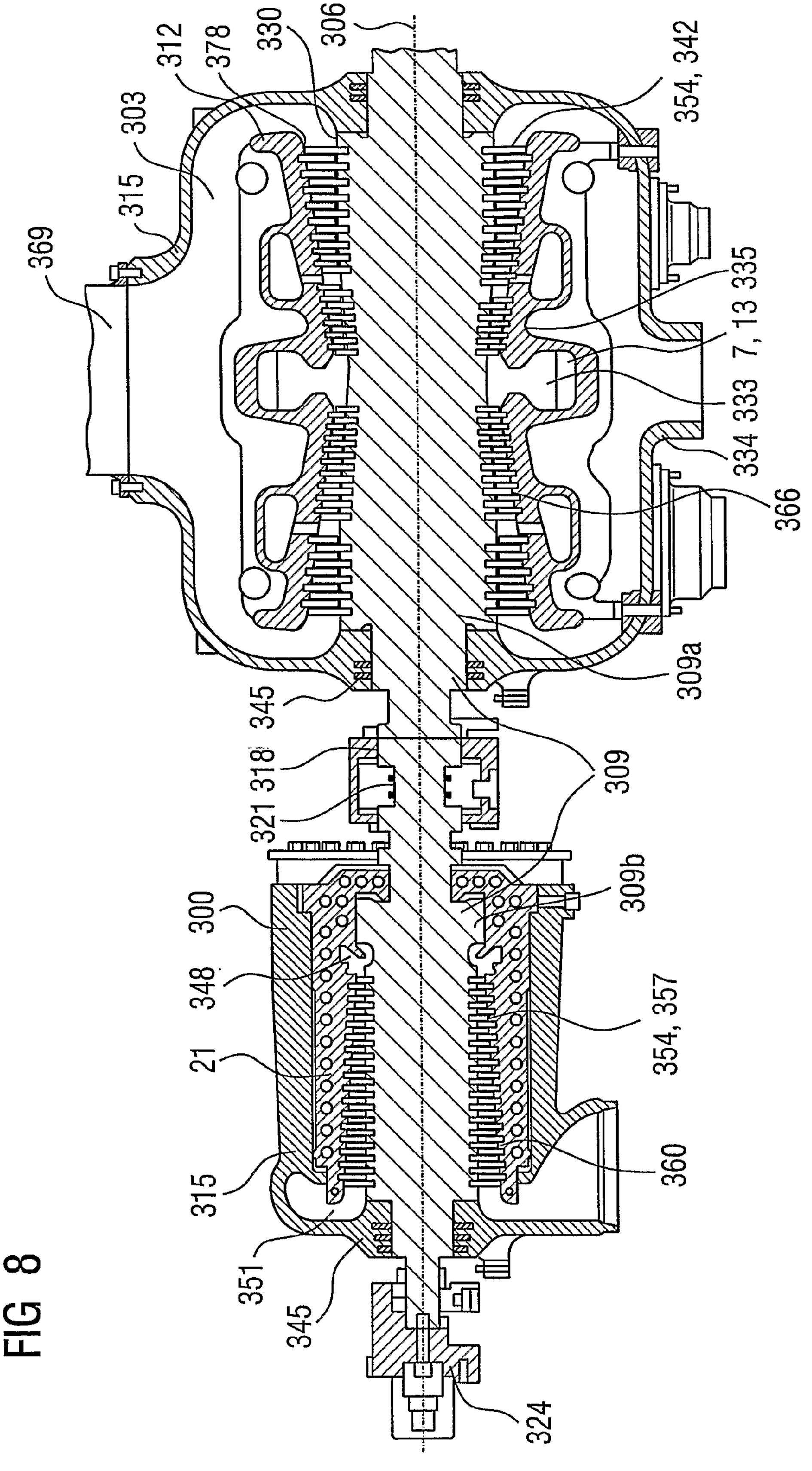
FIG. 8 shows a steam turbine.

FIG. 8 illustrates, by way of example, a steam turbine 300, 303 with a turbine shaft 309 extended along an axis of rotation 306.

The steam turbine has a high-pressure part-turbine 300 and an intermediate-pressure part-turbine 303, each having an inner housing 312 and an outer housing 315 surrounding the inner housing. The high-pressure part-turbine 300 is, for example, of pot-like design. The medium-pressure part-turbine 303 is of two-flow design. It is also possible for the intermediate-pressure part-turbine 303 to be of single-flow design. Along the axis of rotation 306, a bearing 318 is arranged between the high-pressure part-turbine 300 and the intermediate-pressure part-turbine 303, the turbine shaft 309 having a bearing region 321 in the bearing 318. The turbine shaft 309 is mounted on a further bearing 324 next to the high-pressure part-turbine 300. In the region of this bearing 324, the high-pressure part-turbine 300 has a shaft seal 345. The turbine shaft 309 is sealed with respect to the outer casing 315 of the intermediate-pressure part-turbine 303 by two further shaft seals 345.

Between a high-pressure steam inflow region 348 and a steam outlet region 351, the turbine shaft 309 in the high-pressure part-turbine 300 has the high-pressure rotor blading 354, 357. This high-pressure rotor blading 354, 357, together with the associated rotor blades (not shown in more detail), constitutes a first blading region 360. The intermediate-pressure part-turbine 303 has a central steam inflow region 333. Assigned to the steam inflow region 333, the turbine shaft 309 has a radially symmetrical shaft shield 363, a cover plate, on the one hand for dividing the flow of steam between the two flows of the intermediate-pressure part-turbine 303 and also for preventing direct contact between the hot steam and the turbine shaft 309. In the intermediate-pressure part-turbine 303, the turbine shaft 309 has a second blading region 366 having the intermediate-pressure rotor blades 354, 352. The hot steam flowing through the second blading region 366 flows out of the intermediate-pressure part-turbine 303 from an outflow connection piece 369 to a low-pressure part-turbine (not shown) which is connected downstream in terms of flow.

The turbine shaft 309 is composed of two turbine part-shafts 309*a* and 309*b*, which are fixedly connected to one another in the region of the bearing 318.

In particular, the steam inflow region 333 has a thermal barrier coating 7 and an erosion-resistant layer 13.

Figure 9:
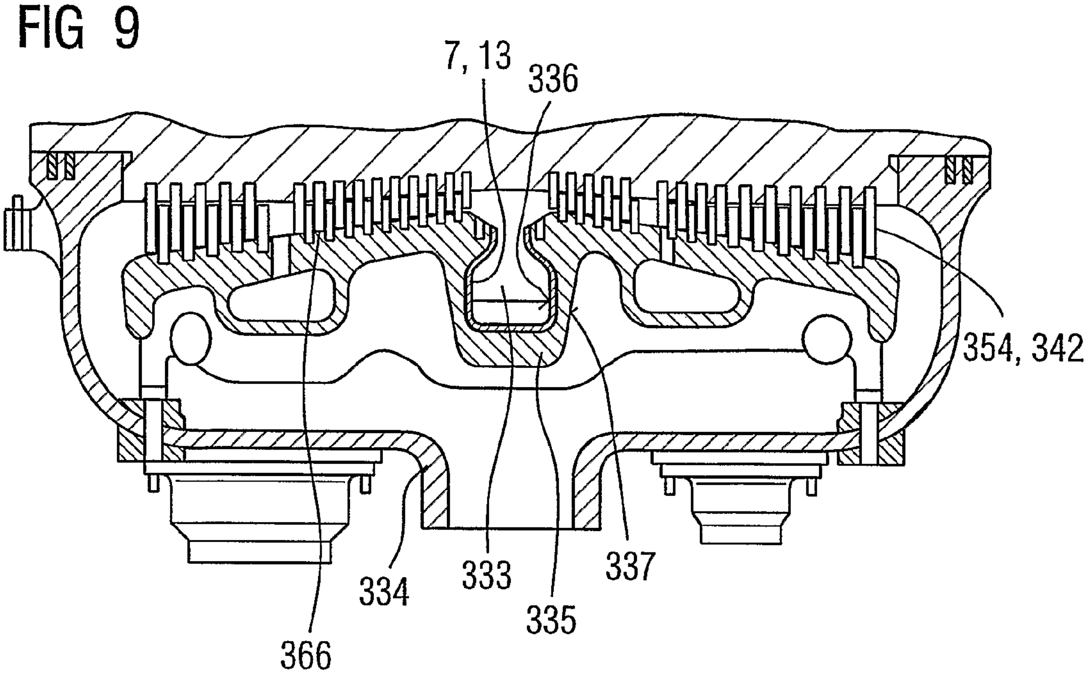

FIG. 9 shows an enlarged illustration of a region of the steam turbine 300, 303. In the region of the inflow region 333, the steam turbine 300, 303 comprises an outer housing 334, which is exposed to temperatures of between 250° and 350° C. Temperatures of from 450° to 800° C. are present at the inflow region 333 as part of an inner housing 335.

This results in a temperature difference of at least 200° C. At the inner housing 335, which is exposed to the high temperatures, the thermal barrier coating 7 is applied to the inner side 336 (for example not to the outer side 337). The thermal barrier coating 7 is locally present only at the inner housing 335 (and for example not in the blading region 366).

The application of a thermal barrier coating 7 reduces the introduction of heat into the inner housing 335, with the result that the thermal expansion properties are influenced. As a result, all the deformation properties of the inner housing 335 and the steam inflow region 333 can be set in a controlled way.

This can be achieved by varying the thickness of the thermal barrier coating 7 or applying different materials at different locations of the surface of the inner housing 335.

It is also possible for the porosity to be different at different locations of the inner housing 335.

The thermal barrier coating 7 can be applied locally, for example in the inner housing 335 in the region of the inflow region 333.

Figure 3:
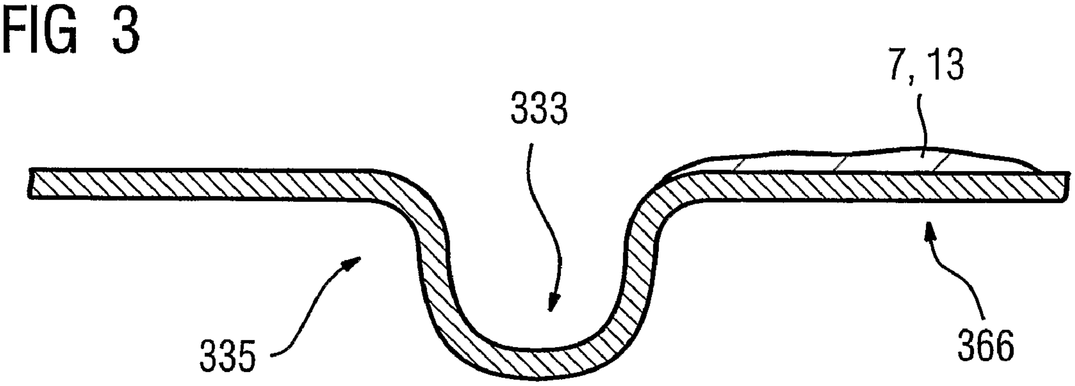
FIGS. 3, 4, 9, 11 show further exemplary embodiments of a component designed in accordance with the invention.

It is also possible for the thermal barrier coating 7 to be applied locally only in the blading region 366 (FIG. 3). The use of an erosion-resistant layer 13 is required in particular in the inflow region 333.

Figure 4:
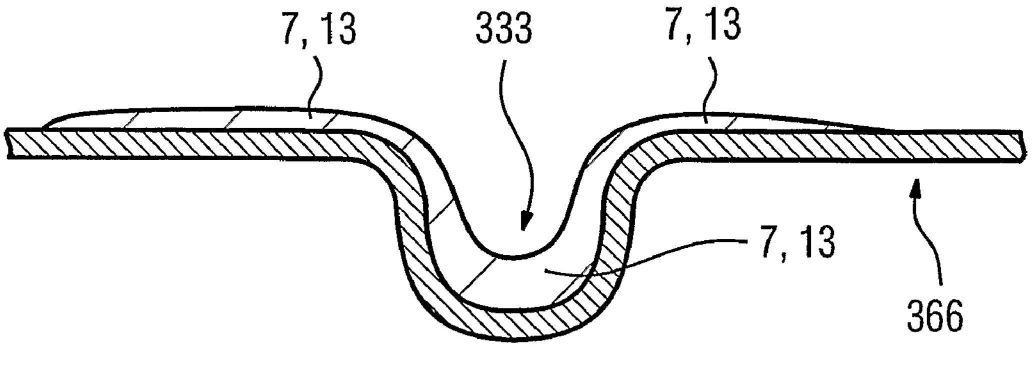

FIG. 4 shows a further exemplary embodiment of a component 1 according to the invention.

Here, the thickness of the thermal barrier coating 7 is greater in the inflow region 333 than in the blading region 366 of the steam turbine 300, 303.

The locally different thickness of the thermal barrier coating 7 sets the introduction of heat and therefore the thermal expansion and consequently the expansion properties of the inner housing 334, comprising the inflow region 333 and the blading region 366, in a controlled way.

Since higher temperatures are present in the inflow region 333 than in the blading region 366, the thicker thermal barrier coating 7 in the inflow region 333 reduces the introduction of heat into the substrate 4 to a greater extent than in the blading region 366, where lower temperatures are present. Therefore, the introduction of heat in both the inflow region 333 and adjoining blading region 366 can be kept approximately equal, so that the thermal expansion is approximately equal.

It is also possible for a different material to be present in the region of the inflow region 333 than in the blading region 366. The thermal barrier coating 6 has in this case been applied throughout the entire hot region, i.e. everywhere, and includes the erosion-resistant layer 13.

Figure 11:
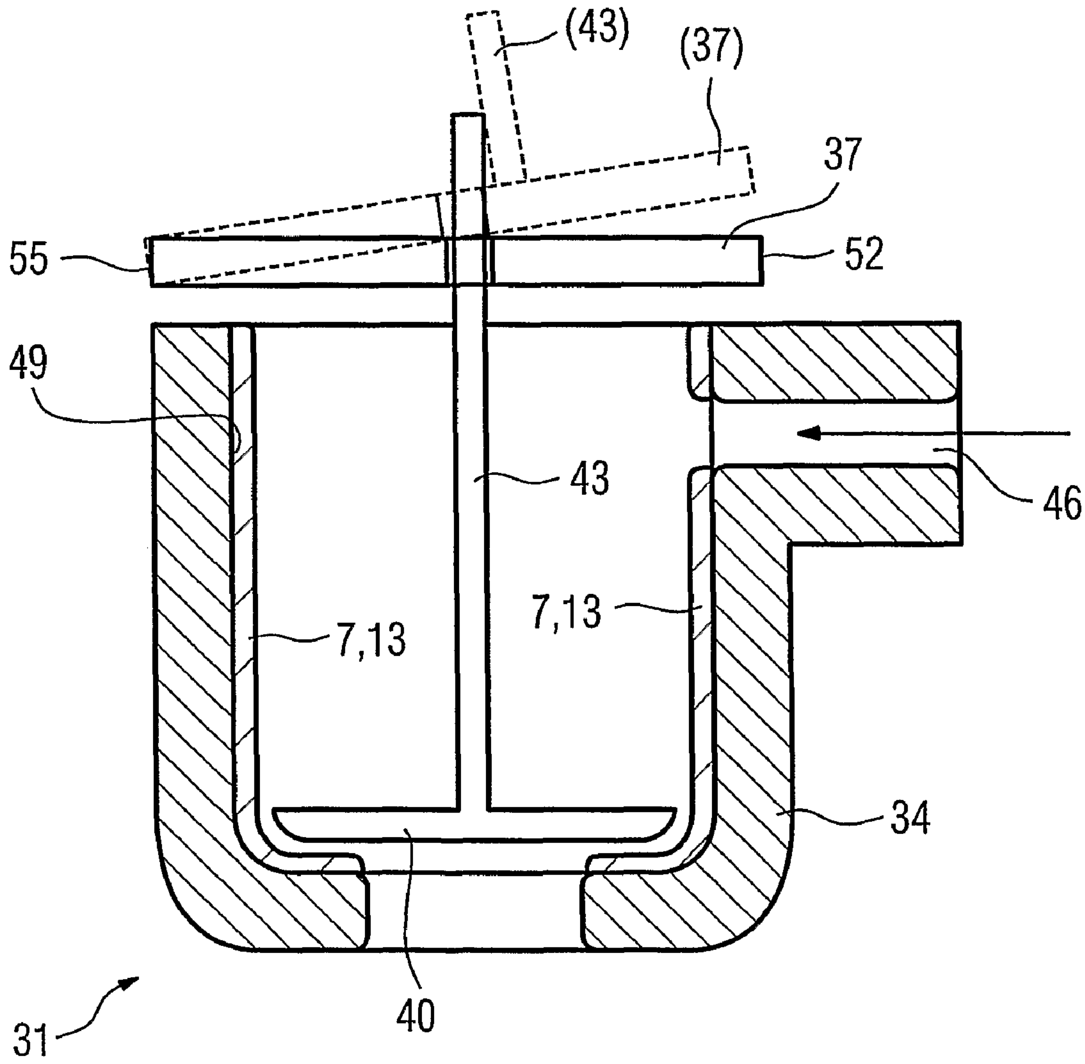

FIG. 11 shows another application example for the use of a thermal barrier coating 7.

The component 1, in particular a housing part, is in this case a valve housing 31, into which a hot steam flows through an inflow passage 46.

The inflow passage 46 mechanically weakens the valve housing. The valve housing 31 comprises, for example, a pot-shaped housing part 34 and a cover 37. Inside the housing part 31 there is a valve comprising a valve cone 40 and a spindle 43.

Component creep leads to uneven axial deformation of the housing 31 and cover 37. The valve housing 31 would expand to a greater extent in the axial direction in the region of the passage 46, leading to tilting of the cover together with the spindle 43, as indicated by dashed lines. As a result, the valve cone 43 is no longer seated correctly, which reduces the leak tightness of the valve.

The application of a thermal barrier coating 7 to an inner side 49 of the housing 31 makes the deformation properties more uniform, so that both ends 52, 55 of the housing 31 and of the cover 37 expand evenly.

Overall, the application of the thermal barrier coating 7 serve to control the deformation properties and therefore to ensure the leak tightness of the valve. The thermal barrier coating once again includes the erosion-resistant layer 13.

Figure 10:
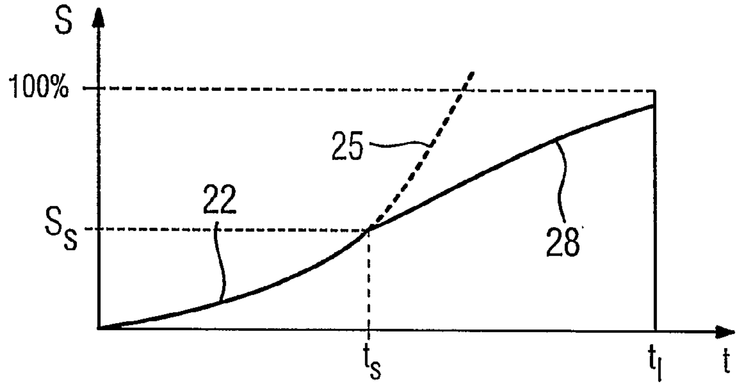
FIG. 10 shows the influence of a thermal barrier coating on the service life of a refurbished component.

FIG. 10 shows the influence of applying a thermal barrier coating 7 to a refurbished component 1.

Refurbishment means that after they have been used, components 1 are reused and before this repaired if necessary, i.e. corrosion and oxidation products are removed and any cracks are detected and repaired, for example by filling with solder or by welding.

Every component 1 has a certain service life until it is 100% damaged.

If the component 1, for example a turbine blade or vane 342, 254, 357 or an inner housing 334, is inspected at a time $t_s$ and refurbished if appropriate, a certain percentage $S_s$ of the damage has been reached. The time profile of the damage to the component 1 is denoted by reference numeral 22.

After the servicing time $t_s$, the damage curve without refurbishment would continue as indicated by the dashed line 25 and rise considerably, since the component, despite maintenance, does not have the same mechanical properties as a newly produced component.

The remaining service life would be relatively short as a result.

The service life of the component 1 is considerably lengthened by the application of a thermal barrier coating 7 and/or erosion-resistant layer 13 to the component 1 which has been subject to preliminary damage or microstructural changes.

The thermal barrier coating 7 reduces the introduction of heat and the damage to components, and consequently the service life profile continues further as indicated by curve 28.

The deformation properties of components 1 are also made more even by the thermal barrier coating 7, resulting, for example, in reduced stresses, which could lead to damage to the component 1.

This likewise increases the service life of the component 1. Therefore, the service life is lengthened by evening out the deformation properties of the component and/or by reducing the introduction of heat into the component 1.

The profile of the curve for a component 1 with thermal barrier coating 7 is considerably flatter than the curve profile 25, with the result that a coated component 1 of this type can be used for at least twice as long.

The invention claimed is:

1. A gas or steam turbine component suitable for use at temperatures up to 850° C., comprising:

a base component;

a ceramic thermal barrier coating applied to the base component;

an intermediate protective MCrA1X layer arranged beneath the thermal barrier coating, where M is at least one element selected from the group consisting of nickel, cobalt and iron, and X is yttrium or silicon or at least one rare earth element; and a metallic erosion-resistant layer applied to the thermal barrier coating, the erosion resistant layer having a lower porosity than the thermal barrier coating, wherein the intermediate protective layer consists of:

11.5 wt % to 20 wt % chromium, 0.3 wt % to 1.5 wt % silicon, 0 wt % to 1 wt % aluminum, 0 to 4 wt % yttrium, and remainder iron.

2. The component as claimed in claim 1, wherein the erosion-resistant layer is chromium carbide with an admixture of nickel.

3. The component as claimed in claim 1, wherein the erosion-resistant layer is a mixture of chromium carbide and nickel-chromium.

4. The component as claimed in claim 1, wherein the erosion-resistant layer is nickel-chromium with admixtures of silicon and boron, or nickel-aluminum.

5. The component as claimed in claim 1, wherein the intermediate protective layer consists of:

12.5 wt % to 14 wt % chromium, 0.5 wt % to 1.0 wt % silicon, 0.1 wt % to 0.5 wt % aluminum 0 to 4 wt % yttrium, and remainder iron.

6. The component as claimed in claim 1, the erosion-resistant layer is NiCr80/20 or an iron-base, nickel-base, chromium-base or cobalt-base alloy, or partially comprises chromium carbide.

7. The component as claimed in claim 1, wherein:

the thermal barrier coating is partially porous, or the thermal barrier coating has a porosity gradient, or the thermal barrier coating porosity is greatest at an outer surface, or the thermal barrier coating porosity is lowest in an outer region of the thermal barrier coating, or the thickness of the thermal barrier varies, or the thermal barrier coating comprises different materials at different locations.

8. The component as claimed in claim 1, wherein the erosion-resistant layer is selected from the group consisting of: tungsten carbide, chromium carbide and nickel.

9. The component as claimed in claim 8, wherein:

the thermal barrier coating is applied in the inflow region and in the blading region of a steam turbine, or the thermal barrier coating is applied only in the inflow region of a steam turbine, or the thermal barrier coating is applied only in the blading region of a steam turbine, or the thermal barrier coating thickness is greater in the inflow region than in the blading region a steam turbine.

10. The component as claimed in claim 1, wherein the component is a turbine blade or vane.

11. The component as claimed in claim 10, wherein the base component is a nickel-base, cobalt-base or iron-base alloy.

12. The component as claimed in claim 11, wherein the thermal barrier coating comprises zirconium oxide ($ZrO_2$) or titanium oxide ($TiO_2$).

13. The component as claimed in claim 1, wherein the component is a housing component of a gas or steam turbine.

14. The component as claimed in claim 13, wherein the housing component is a turbine housing, a valve housing or a steam inflow region housing component.

15. The component as claimed in claim 14, wherein:

the component is exposed to a temperature difference of at least 200° C. during operation produced by a higher temperature on one side of the component and a lower temperature on the other side, and the thermal barrier coating is applied to the higher temperature side of the component to control the thermal deformation of the component.

16. The component as claimed in claim 15, wherein the higher temperature is between 400° C. and 800° C.

* * * * *